United States Patent
Field et al.

(10) Patent No.: US 7,724,431 B2
(45) Date of Patent: May 25, 2010

(54) ACTIVE LAYER

(75) Inventors: Marshall Field, Corvallis, OR (US);
Gregory J. May, Corvallis, OR (US);
Peter J. Fricke, Corvallis, OR (US);
Timothy D. Emmerich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 797 days.

(21) Appl. No.: 11/540,792

(22) Filed: Sep. 29, 2006

(65) Prior Publication Data
US 2008/0080047 A1 Apr. 3, 2008

(51) Int. Cl.
*G03B 21/56* (2006.01)
*G03B 21/60* (2006.01)

(52) U.S. Cl. ............................. 359/443; 359/459
(58) Field of Classification Search .......... 359/443, 359/449, 459
See application file for complete search history.

(56) References Cited

U.S. PATENT DOCUMENTS

| | | | |
|---|---|---|---|
| 3,955,208 A * | 5/1976 | Wick et al. ............... | 396/506 |
| 5,046,793 A | 9/1991 | Hockley et al. | |
| 5,048,931 A | 9/1991 | Magocs | |
| 5,075,789 A | 12/1991 | Jones et al. | |
| 5,111,337 A | 5/1992 | Martinez | |
| 5,175,637 A | 12/1992 | Jones et al. | |
| 5,193,015 A | 3/1993 | Shanks | |
| 5,333,031 A * | 7/1994 | Mukai ....................... | 396/242 |
| 5,335,022 A | 8/1994 | Braun et al. | |
| 5,379,083 A | 1/1995 | Tomita | |
| 5,384,067 A | 1/1995 | Doane et al. | |
| 5,389,945 A | 2/1995 | Sheridon | |
| 5,416,617 A | 5/1995 | Loiseaux et al. | |
| 5,418,631 A | 5/1995 | Tedesco | |
| 5,471,327 A | 11/1995 | Tedesco et al. | |
| 5,534,386 A | 7/1996 | Petersen et al. | |
| 5,541,749 A | 7/1996 | Konuma et al. | |
| 5,609,939 A | 3/1997 | Petersen et al. | |
| 5,629,996 A | 5/1997 | Rizkin et al. | |
| 5,659,408 A | 8/1997 | Wenyon | |
| 5,709,463 A | 1/1998 | Igram | |
| 5,796,376 A | 8/1998 | Banks | |
| 5,808,759 A | 9/1998 | Okamori et al. | |
| 5,906,751 A | 5/1999 | Parker | |
| 5,969,700 A | 10/1999 | Fitzgibbons et al. | |
| 5,997,150 A | 12/1999 | Anderson | |
| 6,100,952 A | 8/2000 | Marvin et al. | |
| 6,124,954 A | 9/2000 | Popovich et al. | |
| 6,157,474 A | 12/2000 | Orr et al. | |
| 6,246,832 B1 * | 6/2001 | Terada ....................... | 396/63 |
| 6,426,836 B2 | 7/2002 | Dorsel et al. | |
| 6,449,089 B1 | 9/2002 | Moshrefzadeh et al. | |
| 6,474,839 B1 | 11/2002 | Hutchison | |
| 6,509,982 B2 | 1/2003 | Steiner | |
| 6,538,814 B2 | 3/2003 | Hunter et al. | |
| 6,690,443 B1 | 2/2004 | Poliakine | |
| 6,836,361 B2 | 12/2004 | Hou | |
| 6,853,486 B2 | 2/2005 | Cruz-Uribe et al. | |
| 6,857,751 B2 | 2/2005 | Penn et al. | |
| 7,633,587 B2 * | 12/2009 | Hyatt ......................... | 349/129 |
| 2004/0012849 A1 | 1/2004 | Cruz-Uribe et al. | |
| 2005/0057803 A1 | 3/2005 | Cruz-Uribe | |

* cited by examiner

*Primary Examiner*—Christopher Mahoney

(57) ABSTRACT

A method and apparatus apply an electric field across active layer, wherein active layer is configured to change from a first light attenuating state to a second lesser light attenuating state in response to the applied the electric field and wherein the second lesser light attenuating state permits light to be reflected from a light reflective face.

19 Claims, 2 Drawing Sheets

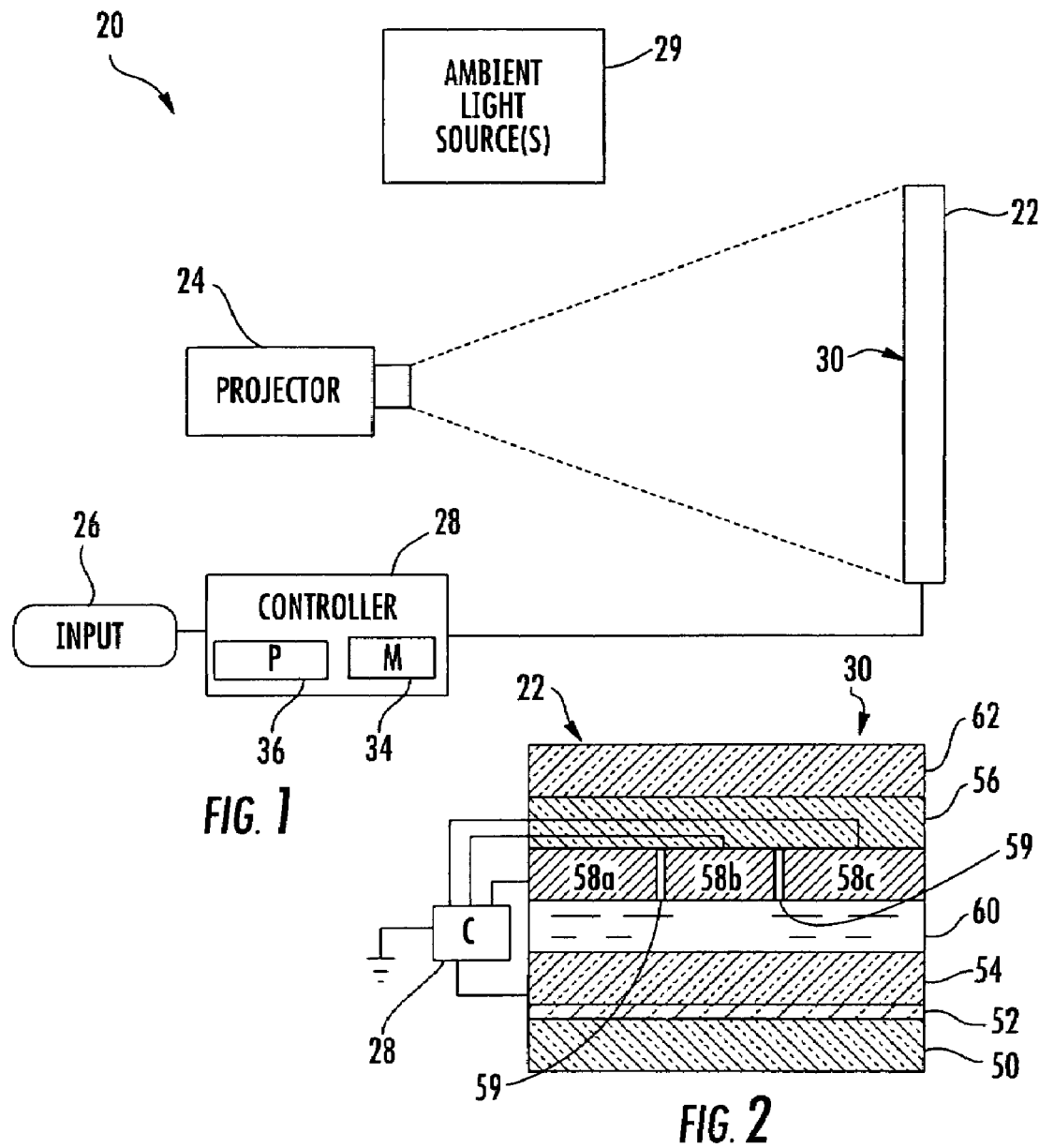
FIG. 1
FIG. 2
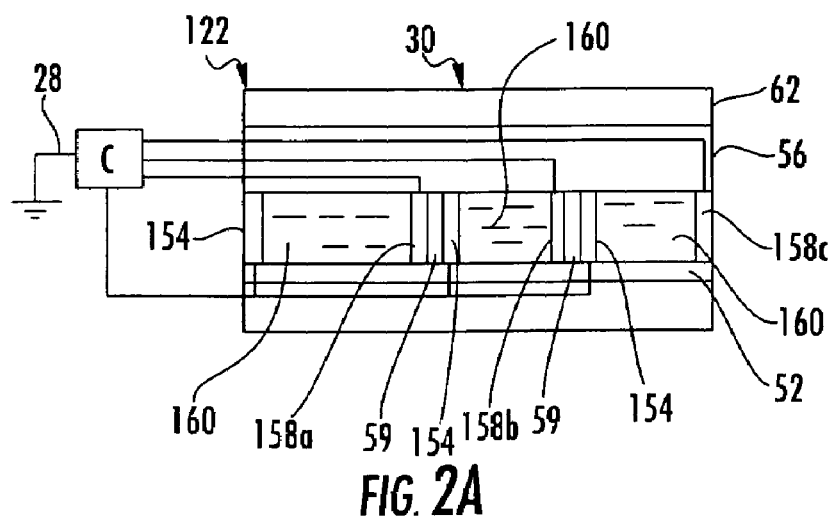
FIG. 2A

ACTIVE LAYER

CROSS-REFERENCE TO RELATED PATENT APPLICATIONS

The present application claims priority under 35 USC 120 from co-pending U.S. patent application Ser. No. 11/167,033 which was filed on Jun. 24, 2005 by Andrew K Juenger, Gregory J. May and Daryl E. Anderson and entitled SCREEN; co-pending U.S. patent application Ser. No. 11/205,672 which was filed on Aug. 17, 2005 by Jian-gang Weng, Gregory J. May, Ron R. Bendsneyder and William J. Allen and entitled PROJECTING A LUMINANCE IMAGE; and co-pending U.S. patent application Ser. No. 11/352,718 which was filed on Feb. 13, 2006 by Gregory J. May and entitled OPTICAL DEVICE, the full disclosures of which are hereby incorporated by reference.

BACKGROUND

Many display systems project and reflect images off of a screen. Ambient light that is also reflected off the screen may reduce image contrast.

BRIEF DESCRIPTION OF THE DRAWINGS

FIG. 1 is a schematic illustration of a projection system according to an example embodiment.

FIG. 2 is a sectional view of a portion of a projection screen of the system of FIG. 1 according to an example embodiment.

FIG. 2A is a sectional view of another embodiment of the projection screen of the system of FIG. 1 according to an example embodiment.

DETAILED DESCRIPTION OF THE EXAMPLE EMBODIMENTS

Figure 3:
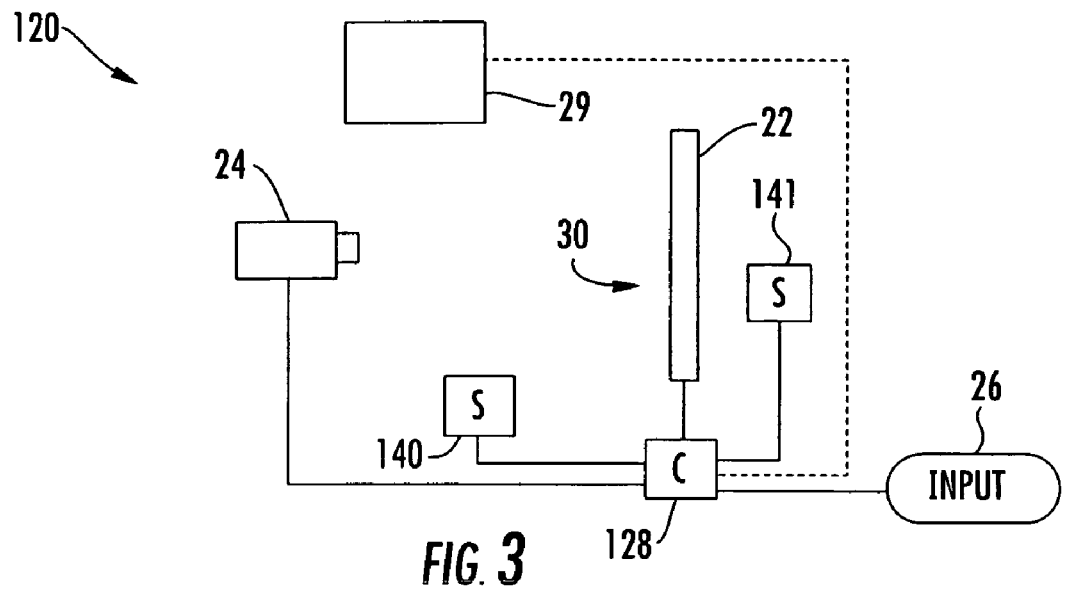
FIG. 3 is a schematic illustration of another embodiment of the projection system of FIG. 1 according to an example embodiment.

FIG. 1 schematically illustrates projection system 20 configured to display images with enhanced contrast in the presence of ambient light. Projection system 20 generally includes screen 22, projector 24, input 26 and controller 28. Screen 22 comprises a structure having an active, front or viewing side 30. Screen 22 is configured to change between different reflective states to enhance contrast in the presence of ambient light from one or more ambient light sources 29, such as ceiling or wall lights, lamps, windows and the like. In one embodiment, screen 22 is configured to change between a first reflective state in which substantially all visible light is reflected away from side 30 and a second reflective state in which a majority of visible light incident upon side 30 is absorbed. According to one embodiment, screen 22 changes between a white reflective state and a second black absorbing state in which a substantial percentage of visible light is absorbed. In other embodiments, screen 22 changes between a first reflective state and a second less reflective state, wherein different levels of electromagnetic radiation, such as infrared light or ultraviolet light are reflected or absorbed.

FIG. 2 is a sectional view schematically illustrating a portion of one embodiment of screen 22 in more detail. As shown by FIG. 2, screen 22 includes back substrate 50, reflective layer 52, electrode 54, substrate 56, electrodes 58a, 58b, 58c (collectively referred to as electrodes 58), active layer 60 and coatings 62. Back substrate 50 serves as a support for reflective layer 52. In one embodiment, back substrate 50 comprises dielectric material such as fiberglass. In other embodiments, back substrate 50 may be formed from other materials such as glass and the like.

Reflective layer 52 comprises a layer of visible light reflecting material supported by back substrate 50. According to one example embodiment, layer 52 is diffusive. In one embodiment, layer 52 has a white face. In one embodiment, layer 52 may be omitted where a diffusive reflective face is alternatively provided by electrode 54 or substrate 50. Because screen 22 includes a diffusive reflective face, images of visible light reflected by screen 22 have a wider viewing cone for users of system 20. In other embodiments, the rear reflecting element (layer 52 or part of layer 50 or electrode 54) may alternatively provide a specular reflective face. In other embodiments, layers 50 and 52 may be omitted or may be semi-reflective, transmitting selected wavelengths or light having selected incident angles.

Electrode 54 comprises a layer of electrically conductive material configured to be electrically charged so as to apply electric field across active layer 60. In the particular embodiment illustrated, electrode 54 is formed from transparent or translucent electrically conductive materials that overlie reflective layer 52. In one embodiment, electrode 54 may comprise a conductive material such as indium tin oxide (ITO) or polyethylene dioxythiophene (PEDOT). In other embodiments, electrode 54 may be formed from other transparent electrically conductive materials.

Front substrate 56 comprises a support structure for electrode 58. Front substrate 56 is formed from an optically transparent and clear dielectric material. In one embodiment, front substrate 56 may be formed from an optically clear and flexible dielectric material such as polyethylene terephalate (PET). In other embodiments, front substrate 56 may be formed from other transparent dielectric materials that may be inflexible such as glass.

Electrodes 58 comprise electrically distinct portions of transparent or translucent electrically conductive material formed upon substrate 56. Electrodes 58 are separated from one another by dielectric spacer material 59, enabling electrodes 58 to be charged differently from one another. Each electrode corresponds to a distinct area of screen 22 that may be selectively changed between different reflective states. As a result, the entire screen may be set to the same reflective state or distinct regions of screen 22 may be set to different reflective states. Although screen 22 is illustrated as having three such distinct portions as provided by electrodes 58a, 58b and 58c for ease of illustration, screen 22 may include a larger number of such electrodes 58 providing a greater number of selectively controllable regions or areas of screen 22. In other embodiments, screen 22 may alternatively include a single electrode 58, wherein the entirety of screen 22 may be actuated to the same reflective state.

Each electrode 58 is configured to be charged so as to cooperate with electrode 54 to create an electric field across active layer 60. In one embodiment, each electrode 58 comprises a transparent conductor such as ITO or PEDOT. In other embodiments, other transparent conductive materials may be used. In the particular embodiment illustrated, each electrode 58 is electrically connected to controller 28 while electrode 54 is electrically connected to ground. In other embodiments, this arrangement may be reversed. In still other embodiments, electrodes 54 and 58 may be charged to distinct voltages by other devices.

Active layer 60 comprises a charge or voltage responsive optical material layer configured to change its transparency in response to changes in an applied voltage or charge. In one embodiment, active layer 60 may change from a transparent clear state, allowing light to pass through active layer 60 and to be reflected by reflective layer 52, to a generally opaque state in which light is absorbed by active layer 60. According to one example embodiment, active layer 60 may comprise a dichroic dye doped polymer dispersed liquid crystal (PDLC) material in which pockets of liquid crystal material are dispersed throughout a transparent polymer layer. In the absence of a sufficiently strong electrical field, active layer 60 is configured to substantially absorb or attenuate light in its relaxed state. In one embodiment, the dyed polymer dispersed liquid crystal is opaquely black in the absence of a sufficiently strong electric field. In other embodiments, active layer 60 may comprise other materials such as electrochromic material, such as tungsten oxide, or photochromic or electrophoretic material (in-plane electrophoretic, electro-wetting).

According to one example embodiment, electrodes 54 and 58 and active layer 60 extend across a majority of surface 30 of screen 22. In one embodiment, electrodes 54 and 58 and active layer 60 extend across substantially all of screen 22 such that the entirety of screen 22 is changed between different reflective states. In yet other embodiments, surface 30 may be pixelated into multiple pixels defined by distinct electrodes which may be charged independently of one another to actuate distinct portions of screen 22 to different reflectivity states.

Coatings 62 comprise one or more layers deposited or otherwise formed upon substrate 56 opposite to electrode 58. Coatings 62 may comprise a front plane diffuser and may include an anti-reflection layer such as anti-glare surface treatment, an ambient rejection layer, such as a plurality of optical band pass, or a series of micro lenses and/or partial diffuse layers. In other embodiments, coating layer 62 may be omitted.

Projector 24 comprises a device configured to project light towards surface 30 of screen 22 such that the incident light is reflected from surface 30 and is viewable by an observer. In one embodiment, projector 24 is configured to project color images at screen 22. In one embodiment, projector 24 may comprise a digital light processing (DLP) projector. In other embodiments, projector 24 may comprise a 35 millimeter projector, an overhead projector or other devices configured to project images of light upon screen 22. In other embodiments, projector 24 may be configured to project other wavelengths of electromagnetic radiation such as infrared light or ultraviolet light and the like.

Input 26 comprises one or more devices serving as an interface with controller 28. In one embodiment, input 26 comprises a human interface, permitting a user to input commands, selections or instructions to controller 28 for the operation of screen 22. Examples of input 26 include, but are not limited to, a keyboard, a mouse, a touch screen, a microphone with appropriate voice recognition software, a stylus, a button, slide, switch and the like. In other embodiments, input 26 may comprise an electronic interface through which command signals from an external electronic device may be transmitted to controller 28. Examples of such an input 26 may comprise a port or cable, such as a USB port.

Controller 28 comprises a device configured to generate control signals for the operation of at least screen 22. Controller 28 generally includes memory 34 and processor 36.

Memory 34 comprises a computer readable medium such as random access memory (RAM), read-only-memory (ROM) or some other form of persistent storage. Memory 34 may comprise hard-wired circuitry, optical media, magnetic media or other forms of media configured to store data and instructions. In one embodiment, memory 34 may be permanently associated with processor 36. In another embodiment, memory 34 may be portable or removable with respect to processor 36. In particular embodiments, portions of memory 34 may be permanently associated with processor 36 while portions of memory 34 are portable or removable. Memory 34 contains stored instructions for processor 36.

Processor 36 comprises a processing unit configured to generate control signals and to perform calculations based upon instructions contained in memory 34 and based upon selections or commands received through input 26. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 28 may be embodied as part of one or more application-specific integrated circuits (ASICs). Controller 28 is not limited to any specific combination of hardware circuitry and software, nor to any particular source for the instructions executed by the processing unit.

In one embodiment, processor 36 and memory 34 may be physically associated with screen 22. In another embodiment, processor 36 and memory 34 may be physically associated with controller 28. In still another embodiment, processor 36 and memory 34 may be physically associated with another module or electronic device independent of screen 22 and projector 24.

Processor 36 communicates control signals to screen 22 to direct the operation of screen 22. In one embodiment, processor 36 may communicate to screen 22 via hard-wiring, electrical cabling or optical cabling. In another embodiment, processor 36 may communicate control signals to screen 22 wirelessly, optically or through the use of infrared signals.

In operation, processor 36 receives commands or instructions for the operation of screen 22 from execution commands internal to controller 28 or via input 26. For example, in one scenario, a person may enter or select the desired level of reflectivity of screen 22 based upon the user's perception of visual images projected by projector 24 and reflected from screen 22 in the presence of ambient light from ambient light sources 29. Alternatively, an external device, distinct from screen 22 may input a desired level of reflectance for screen 22 based upon other instructions received by the external device from a person or based upon conditions, such as ambient light levels, sensed by the external device or yet another device.

In response to receiving such instructions or commands via input 26 and based upon instructions contained in memory 34, processor 36 generates control signals which direct or control the reflectance level of screen 22 over time or based on image content. For example, command information or data may be embedded in the data signal extracted from video stream going to the projector 24. In particular, processor 36 generates control signals controlling the level of charge or voltage applied to electrode 58 of screen 22. In one embodiment, controller 28 may include one or more switching devices, such as transistors, diodes, metal-insulator-metal devices and the like to selectively control the supply of electrical charge or current from a voltage source (not shown) to electrode 58.

In response to being charged, electrodes 58 create one or more electrical fields with electrode 54, which is at a distinct voltage or ground, across active layer 60. As a result, active layer 60 changes or transitions from a first light attenuating state to a second lesser light attenuating state. In those embodiments in which layer 60 comprises a dyed PDLC, layer 60 transitions from a substantially opaque black state in which substantially all visible light is absorbed or attenuated towards a transparent or substantially clear state in which visible light, such as light from projector 24, is permitted to pass through layer 60 and to be reflected off reflective layer 52. The visible light reflected off of layer 52 once again passes through layer 60 back towards viewers of screen 22.

Based upon levels of ambient light, the percent of light attenuated by active layer 60 and the corresponding amount of visible light and ambient light reflected by layer 52 of screen 22 may be selectively adjusted by selectively controlling the strength of the electrical field created by electrodes 54 and 58 across active layer 60. In particular embodiments, the strength of the electrical field created across active layer 60 may be controlled such that active layer 60 switches between a first light attenuating state in which substantially all visible light is attenuated or absorbed and a substantially clear state in which substantially all visible light is transmitted. In yet other embodiments, the strength of the electrical field created across active layer 60 by electrodes 54 and 58 may provide intermediate attenuation levels and corresponding intermediate levels of reflectivity for screen 22.

According to one example mode of operation, controller 28 generates control signals to selectively lower a black point (the ability of the screen to absorb incident light) of the screen based at least in part upon the image being projected. In particular, controller 28 generates control signals establishing a blacker black at the screen by dropping the black level of the screen by making it less reflective during dark scenes of the projected image. In one embodiment, the entirety of screen 22 is changed to a selected black point. In another embodiment, selected sections of the screen 22 with resolution less than or up to the projected image may be provided with a selected lower black point. This improves the overall contrast by allowing the dark portions of the image to go blacker than when just using a white diffusive screen. At the same time, the brighter portions of the image are allowed to be transmitted to the reflective layer 52, maintaining their brightness. The changing of selected portions of the screen between different reflective states or black points can be done at higher speeds than eye can detect or stay constant during scenes, providing a perception of higher dynamic range (brightest portion to darkest portion). As a result, portions of screen 22 may be controlled to provide different surface reflectivity response curves for differing ambient lighting conditions and/or on a scene by scene basis. Different ambient light can benefit from different curves on the surface of the screen.

Because screen 22 includes an active layer that may be selectively actuated between a first attenuating relaxed state in which the active layer is substantially attenuates or absorbs visible light and a second excited less attenuating state in which light passes through the active layer and is reflected in off of a diffuse reflective face, screen 22: (1) reflects a sharper image, (2) is less affected by ambient light and (3) has a less complex and more compact construction. First, because screen 22 uses a reflective rear surface as the imaging surface from which light from the projector is reflected, versus using a white polymer dispersed liquid crystal in a relaxed state as the imaging surface, reflected images from screen 22 are sharper. White PDLC material tends to create reflections at different depths of the material lending to the soft image. Second, when aligned to permit light to pass through material, the suspended and dyed (black) liquid crystals of active layer 60 tend to reject indirect ambient light, providing light that is projected through active layer 60 against layer 52 with more saturated colors. Lastly, because diffusive reflective layer 52 may be closely positioned with respect to active layer 60 as compared to an absorbing backer which is spaced from active layer 60 to maintain the white level of the PDLC, screen 62 may be thinner and is less complex.

FIG. 2A is a sectional view schematically illustrating screen 122, another embodiment of screen 22. Screen 122 is similar to screen 22 except that screen 122 includes electrodes 154; 158a, 158b, 158c (collectively referred to as electrodes 158) and active layer 160 in lieu of electrodes 54, 58 and active layer 60, respectively. Those remaining elements of screen 122 which correspond to elements of screen 22 are numbered similarly. Electrodes 154 and 158 are similar to electrodes 54 and 58 except that electrodes 154 and 158 extend orthogonal to front side 30 of screen 122. Active layer 160 is similar to active layer 60 except that active layer 160 comprises electro-wetting or in-plane-electrophoretic, wherein the charge is substantially orthogonal to the layer 160 and wherein particles move side to side rather than from front to back but substantially perform the same function as layer 60. Like active layer 60, active layer 160 changes or transitions from a substantially opaque black or darkened state in which substantially all visible light is absorbed or attenuated towards a transparent or substantially clear state in which light, such as light from projector 24 (shown in FIG. 1), is permitted to pass through layer 160 and to be reflected off reflective layer 52.

FIG. 3 schematically illustrates projection system 120, another particular embodiment of projection system 20. Projection system 120 is similar to projection system 20 except that projection system 120 includes controller 128 in lieu of controller 28 and additionally includes a sensors 140 and 141. Those remaining components of projection system 120 which correspond to components of projection system 20 are numbered similarly. In the particular embodiment shown in FIG. 3, sensors 140 and 141 each comprise one or more light sensors configured to sense light emitted or transmitted by ambient light source 29. Sensor 140 is located on front side 30 of screen 22. At least one sensor 141 is located behind screen 22. In those embodiments in which layer 52 is semi-reflective and layer 50 is transparent, translucent or semi-reflective, such as when layer 52 is formed from partially coated or patterned (with holes) reflective material such as aluminum coating and layer 50 is transparent, sensor 141 senses ambient light at one or more locations along screen 22. In one embodiment, sensor 140 comprises a photo sensitive electronic device such as a CdS (Cadmium Sulfide) photoresistor which senses changes in light. Other sensor examples include phototransistors and solar cells. In one embodiment, sensors 140 and 141 may comprise cameras. In other embodiments, sensors 140 and 141 may each comprise an electrical connection or other sensor directly connected to or associated with one or more of ambient light sources 29 to detect a characteristic of ambient light source 29 which corresponds to a level of the ambient lighting provided by the one or more sources. Sensor 140 or 141 communicates signals to controller 128.

Controller 128 is similar to controller 28 except that controller 128 is configured to selectively actuate screen 22 between different reflective states based ambient light characteristics. Like controller 28, controller 128 in one mode of operation is configured to selectively actuate screen 22 between different reflective and states by selectively activating active layer 60 (shown in FIG. 2) between different light attenuating states based upon instructions or commands received via input 26. However, controller 128 is additionally configured to operate in an automatic mode, wherein controller 128 automatically adjusts the reflectivities of screen 22 by automatically changing attenuation or reflective states of active layer 60 (shown in FIG. 2) or selected portions of screen 22 based upon ambient light conditions. (For example, the top portion of the screen, begin closer to the ambient source may nave more intense ambient to compensate for than the bottom part of the screen.) As shown in FIG. 3, controller 128 is in communication with sensor 140. Such communication may be provided by electrical signal transmitting lines, optically or wirelessly. In response to changes in ambient light conditions, controller 128 automatically takes into account the changing light conditions and changes the reflectivity of screen 22 to enhance contrast of images provided by projector 24.

As a result, the ambient light input from sensor 140 can automate the input of ambient light conditions. Based on such automated input of ambient light conditions, controller 22 may set the screen to one gray state (passive control) or may adjust screen 22 to one ambient condition with a time variant action—i.e. turning black and white, may adjust sections varying with projected image scenes or may coordinate the reflective state of screen 22 with room light flicker. For example, changing light sources in a room between different light emitting states at a rate greater than the flicker fusion frequency of a human eye and changing reflective states of the screen also at a frequency greater than the flicker fusion frequency of a human eye, wherein the screen is in a greater reflective state while the room's light sources are off or are in a lesser emissive state, and vice versa.

As illustrated by broken lines, in other embodiments, controller 128 may also or alternatively be in communication with one or more of the ambient light sources 29. Controller 128 may sense or otherwise receive signals indicating operating characteristics of such ambient light sources 29, enabling controller 128 to determine ambient lighting conditions. For example, in one embodiment, controller 128 may be configured to receive signals indicating power consumption of one or more light sources 29. As the power consumption increases, the level of ambient lighting also increases. Based upon such feedback, controller 128 may adjust the reflectivity of screen 22.

Figure 4:
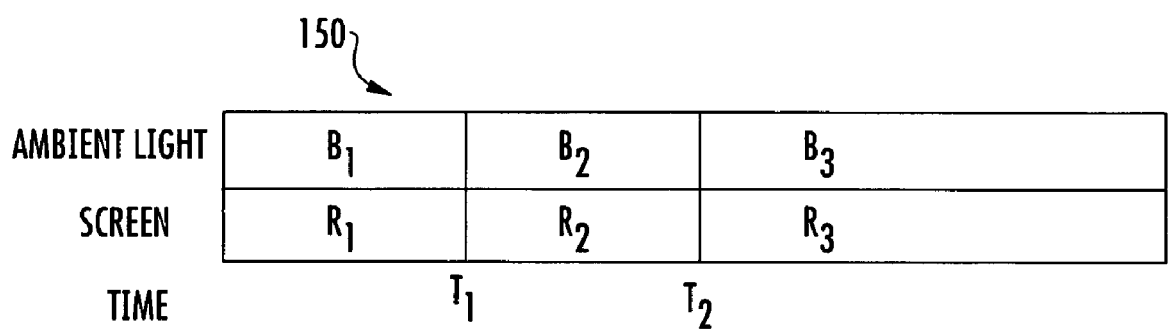
FIG. 4 is a schematic illustration of a timing sequence of the projection system of FIG. 3 according to an example embodiment.

FIG. 4 schematically illustrates one example timing sequence 150 for projection system 120. In particular, FIG. 4 illustrates changing of screen 22 between different reflective states R1, R2 and R3 in response to changes in ambient lighting conditions B1, B2 and B3. According to one example, ambient lighting proximate to screen 22 changes at time T1 from a first brightness level B1 to a second greater brightness level B2 and changes at time T2 to an even greater brightness level B3. In response to such changes in ambient lighting conditions, controller 128 (shown in FIG. 3) changes the reflectivity of screen 22 at time T1 from a first reflectivity level R1 to a lesser reflectivity level R2. At time T2, controller 128 changes the reflectivity level of screen 22 to an even lesser reflectivity level R3. Time can be very short (more dynamic within each frame of a projected scene) or very long (nearly static and being consistent with the ambient environment). By lowering the reflectivity of screen 22 in response to brighter ambient lighting conditions, less ambient light is reflected by screen 22 and the contrast of the image provided by projector 24 is enhanced.

As further shown by FIG. 3, in the embodiment illustrated, controller 128 is additionally in communication with projector 24. Such communication may be provided by hard wire electrical lines, by optical lines or wirelessly such as with infrared or radio frequency waves. Controller 128 is additionally configured to operate in a flickering mode in which controller 128 coordinates the operation of projector 24 and the changing of screen 22 between different reflective states to enhance contrast of the images reflected by screen 22. In particular, controller 128 generates control signals such that screen 22 is in a less reflective state while the intensity of light projected by projector 24 is also lower or zero between projected frames, subframes or colorwheel transitions. As a result, the amount of ambient light reflected by screen 22 is reduced, enhancing contrast of the images seen on screen 22.

Figure 5:
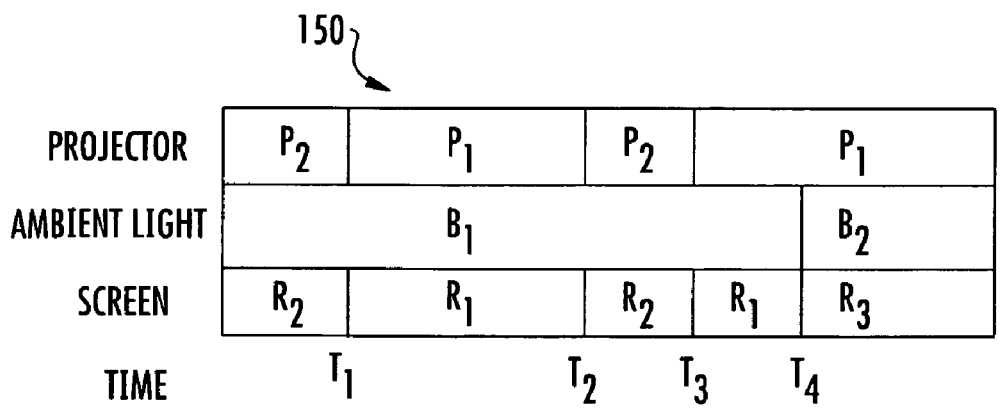
FIG. 5 is a schematic illustrate and of another timing sequence of the projection system of FIG. 3 according to an example embodiment.

FIG. 5 schematically illustrates another example timing sequence 160 for projection system 120. As shown by FIG. 5, projector 24 (shown in FIG. 3) changes between a first projection state P1 and a second projection state P2. During projection state P1, projector 24 is projecting a higher intensity level of light towards screen 22, such as when projector 24 is projecting a visible image or pattern of light towards screen 22. During projection state P2, projector 24 is projecting a lesser intensity of light or even no light for screen 22. The transitioning a projector 24 between projection states P1 and P2 is indiscernible to the human eye as the cycling of projector 24 through such states occurs at a frequency greater then the flicker fusion frequency, nominally at least about 50 times per second.

Controller 128 coordinates the changing of screen 22 between reflective states, such as R1, R2 and R3, with the operation of projector 24. In the example illustrated, controller 128 (shown in FIG. 3) generates control signals such that screen 22 is in the greater reflective state R1 while projector 24 is in projection state P1. Controller 128 control screen 22 such that screen 22 is in the lesser reflective state R2 while projector 24 is in projection state P2 (i.e. projecting a darker image). As result, less ambient light is reflected by screen 22 without substantially affecting reflection of light projected by projector 24.

As further shown by FIG. 5, in particular embodiments, the reflectivity of screen 22, may be further adjusted based upon ambient lighting conditions. In the example illustrated, at a time T4, ambient lighting conditions change from a first brightness level B1 to a second greater brightness level B2. In response to detecting such change via sensor 140 (shown in FIG. 3) or directly via communication with ambient light sources 29, controller 128 generates control signals actuating screen from the first reflective state R1 to reflect the state R3 in which screen 22 reflects less light as compared to reflective state R1. In such a scenario, controller 128 may generate control signals such that screen 22 actuates to reflect a state R3 each time projector 24 changes to projection state P1 while ambient lighting conditions are at brightness level B2. As a result, contrast of the projected image may be further enhanced.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a projection screen comprising:
    a light reflective face;
    a first electrode;
    a second electrode;
    an active layer opposite the reflective face, wherein the first electrode and a the second electrode are configured to apply an electric field across the active layer and wherein the active layer is configured to change from a first light attenuating state to a second lesser light attenuating state in response to the applied the electric field; and
    a sensor configured to sense ambient light; and
    a controller in communication with the sensor and configured to generate control signals based on the sensed ambient light, wherein the first and second electrical electrodes apply the electric field to the active layer in response to the control signals.

2. The system of claim 1, wherein the active layer comprises a dyed polymer dispersed liquid crystal.

3. The system of claim 1, wherein the light reflective face comprises a diffusive light reflective face and wherein the first electrode provides the diffusive light reflective face.

4. The system of claim 1, wherein the reflective face is substantially white.

5. The system of claim 4, wherein the active layer is substantially black in the absence of an applied electric field.

6. The system of claim 1 further comprising a projector configured to project light at the reflective face.

7. The system of claim 6, wherein the projector is configured to change between a first projection state in which a first intensity of light is projected and a second projection state in which a second lesser intensity of light is projected and wherein the apparatus further comprises a controller configured to generate control signals, wherein the first and second electrodes apply the electric field to the active layer in response to the control signals and wherein the controller is configured to generate the control signals such that the active layer is in the first attenuating state during the second projection state.

8. The system of claim 7, wherein the active layer is substantially black in the first state.

9. The system of claim 1, wherein the projection screen includes a plurality of independently chargeable first electrodes opposite distinct portions of the screen such that the distinct portions of the screen may be independently actuated between the first light attenuating state and the second light attenuating state.

10. The system of claim 1, wherein the first electrode, the second electrode and the active layer extend across a majority of a projection surface of the screen.

11. A method comprising:
    sensing ambient light;
    applying an electric field to an active layer based on the sensed ambient light to change the active layer of a projection screen from a substantially black color to a light transmissive state.

12. The method of claim 11 further comprising reflecting light off of a reflective surface and through the active layer while the active layer is in the light transmissive state.

13. The method of claim 11 further comprising projecting an image of light off of a diffusive reflective surface and through the active layer while the active layer is in the light transmissive state.

14. The method of claim 13 further comprising:
    controlling a projector projecting the image of light such that the projector changes between a first projection state in which a first intensity of light is projected and a second projection state in which a second lesser intensity of light is projected; and
    at least reducing the electric field applied to the active layer to reduce the reflectivity of the active layer to a darkened state such that the active layer has the darkened state while the projector is in the second projection state.

15. The method of claim 13, wherein the diffusive reflective surface is substantially white.

16. The method of claim 11, wherein the active layer is a dyed polymer dispersed liquid crystal.

17. The method of claim 11 further comprising applying different electrical fields to different portions of the active layer.

18. A system comprising:
    a sensor configured to sense ambient light;
    a projection screen comprising:
    a first electrical electrode;
    a second electrical electrode; and
    an active layer proximate the first electrical electrode and the second electrical electrode; and
    a controller in communication with the sensor and configured to generate control signals based on the sensed ambient light, wherein the first electrode and the second electrode apply the electric field to the active layer in response to the control signals.

19. The system of claim 18 further comprising a diffusive light reflective surface opposite the active layer.

* * * * *

UNITED STATES PATENT AND TRADEMARK OFFICE
CERTIFICATE OF CORRECTION

| | | |
|---|---|---|
| PATENT NO. | : 7,724,431 B2 | Page 1 of 1 |
| APPLICATION NO. | : 11/540792 | |
| DATED | : May 25, 2010 | |
| INVENTOR(S) | : Marshall Field et al. | |

It is certified that error appears in the above-identified patent and that said Letters Patent is hereby corrected as shown below:

In column 9, line 18, in Claim 1, delete "a the" and insert -- the --, therefor.

Signed and Sealed this
Tenth Day of April, 2012

David J. Kappos
*Director of the United States Patent and Trademark Office*